US012810152B2

(12) United States Patent
Hercock et al.

(10) Patent No.: US 12,810,152 B2
(45) Date of Patent: Nov. 24, 2026

(54) NEURAL NETWORK ARRANGEMENT

(71) Applicant: BRITISH TELECOMMUNICATIONS PUBLIC LIMITED COMPANY, London (GB)

(72) Inventors: Robert Hercock, London (GB); Alexander Healing, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 609 days.

(21) Appl. No.: 18/258,761

(22) PCT Filed: Dec. 1, 2021

(86) PCT No.: PCT/EP2021/083782
§ 371 (c)(1),
(2) Date: Jun. 21, 2023

(87) PCT Pub. No.: WO2022/135856
PCT Pub. Date: Jun. 30, 2022

(65) Prior Publication Data
US 2024/0078424 A1 Mar. 7, 2024

(30) Foreign Application Priority Data
Dec. 22, 2020 (GB) ...................................... 2020439

(51) Int. Cl.
*G06N 3/00* (2023.01)
*G06N 3/08* (2023.01)

(52) U.S. Cl.
CPC ...................................... *G06N 3/08* (2013.01)

(58) Field of Classification Search
None
See application file for complete search history.

(56) References Cited

U.S. PATENT DOCUMENTS 4,912,655 A * 3/1990 Wood ...................... G06N 3/084 706/25
5,052,043 A * 9/1991 Gaborski ............... G06N 3/084 706/20

(Continued)

FOREIGN PATENT DOCUMENTS

WO 2020236255 A1 11/2020

OTHER PUBLICATIONS

F. C. Hoppensteadt and E. M. Izhikevich, "Pattern recognition via synchronization in phase-locked loop neural networks," May 2000 in IEEE Transactions on Neural Networks, vol. 11, No. 3, pp. 734-738, (Year: 2000).*

(Continued)

*Primary Examiner* — Polina G Peach
(74) *Attorney, Agent, or Firm* — Nixon & Vanderhye P.C.

(57) ABSTRACT

A computer implemented method of a machine learning algorithm modelling a target function mapping inputs in an input domain to outputs in an output range, the machine learning algorithm including an array of processing nodes arranged in a network of layers of nodes including an input layer for receiving an input value, an output layer for providing an output value, and one or more intermediate layers between the input and output layers, each node in the processing set being outside the input layer receiving input from at least some adjacent nodes logically closer to the input layer via weighted connections between nodes, and each node being outside the output layer generating output to at least some adjacent nodes logically closer to the output layer via weighted connections between nodes, wherein each node includes: an adjustable weight for application to each input to the node, the adjustment weight being responsive to a threshold function applied to a value of the node input; a combination function for combining outputs of the threshold function; and a node bypass function for selec- (Continued)

tively mapping one or more of the inputs to the node to the output of the node, the method comprising iteratively training the machine learning algorithm to model the target function by adjustment, at each iteration, of at least weights of connections between at least a subset of the nodes, such that the nodes of the network are programmable during operation of the algorithm by adjustment of the threshold function and the bypass function so as to selectively emphasise subsets of nodes in the network.

20 Claims, 2 Drawing Sheets

(56) References Cited

U.S. PATENT DOCUMENTS

| | | | | |
|---|---|---|---|---|
| 6,424,961 | B1 * | 7/2002 | Ayala | G06N 3/08 706/16 |
| 6,581,046 | B1 * | 6/2003 | Ahissar | G06N 3/049 706/15 |
| 7,280,989 | B1 * | 10/2007 | Hoppenstedt | G06V 10/40 706/26 |
| 10,515,312 | B1 * | 12/2019 | Kubo | G06N 3/04 |
| 11,875,247 | B1 * | 1/2024 | Heaton | G06N 3/063 |
| 2017/0177998 | A1 * | 6/2017 | Pescianschi | G06N 3/063 |
| 2017/0185897 | A1 * | 6/2017 | Droppo | G06F 11/0721 |
| 2018/0032866 | A1 * | 2/2018 | Son | G06F 5/01 |
| 2018/0053085 | A1 * | 2/2018 | Matsumoto | G06N 3/048 |
| 2018/0114115 | A1 * | 4/2018 | Liang | G06N 3/0442 |
| 2018/0285715 | A1 * | 10/2018 | Son | G06N 3/0464 |
| 2018/0373986 | A1 * | 12/2018 | Rainwater | G06F 11/36 |
| 2019/0080240 | A1 * | 3/2019 | Andoni | G06N 3/086 |
| 2019/0147318 | A1 * | 5/2019 | Howard | G06N 3/0464 706/27 |
| 2019/0286951 | A1 * | 9/2019 | Rabinovich | G06F 18/24 |
| 2019/0378017 | A1 * | 12/2019 | Kung | G06N 3/0464 |
| 2020/0134459 | A1 * | 4/2020 | Zeng | G05D 1/0088 |
| 2020/0211147 | A1 * | 7/2020 | Doyle | G06F 9/5077 |
| 2020/0364545 | A1 * | 11/2020 | Shattil | G06F 17/16 |
| 2020/0372124 | A1 * | 11/2020 | Ting | G06N 3/09 |
| 2021/0056422 | A1 * | 2/2021 | Thakker | G06F 17/18 |
| 2021/0157767 | A1 * | 5/2021 | Ross | G06F 9/3885 |
| 2021/0201136 | A1 * | 7/2021 | Chalamalasetti | G06N 3/0499 |
| 2022/0027709 | A1 * | 1/2022 | Honkala | G06V 10/82 |
| 2022/0138578 | A1 * | 5/2022 | Nakadai | G06N 3/082 706/15 |
| 2022/0335296 | A1 * | 10/2022 | Baker | G06N 3/08 |
| 2025/0193214 | A1 * | 6/2025 | Hercock | H04L 63/1416 |
| 2026/0010773 | A1 * | 1/2026 | Fortkort | G06N 3/0475 |

OTHER PUBLICATIONS

International Preliminary Report on Patentability dated Jun. 13, 2023 issued for International Application No. PCT/EP2021/083782 (9 pages).

Filippo Maria Bianchi, et al., "An overview and comparative analysis of Recurrent Neural Networks for Short Term Load Forecasting", May 2017, 41 pages, https://arxiv.org/abs/1707.04378.

Xiaocong Du, et al., "Efficient Network Construction Through Structural Plasticity", IEEE Journal of Emerging and Selected Topics in Circuits and Systems, vol. 9, No. 3, Sep. 1, 2019, pp. 453-464.

Alex Graves, et al., "Speech Recognition With Deep Recurrent Neural Networks", In Proc. ICASSP, Department of Computer Science, University of Toronto, Mar. 22, 2013, 5 pages.

International Search Report and Written Opinion of the ISA for PCT/EP2021/083782 dated Mar. 14, 2022, 16 pages.

Combined Search Report and Examination Report for GB Application No. 2020439.2 dated Oct. 13, 2021, 10 pages.

Communication pursuant to Article 94(3) EPC issued for European Application No. 21 823 279.1, dated Jan. 2, 2026 (9 pages).

* cited by examiner

NEURAL NETWORK ARRANGEMENT

This application is the U.S. national phase of International Application No. PCT/EP2021/083782 filed Dec. 1, 2021 which designated the U.S. and claims priority to GB Application No. 2020439.2 filed Dec. 22, 2020, the entire contents of each of which are hereby incorporated by reference.

The present invention relates to the provision of machine learning algorithms and the execution of machine learning algorithms.

BACKGROUND AND SUMMARY

Machine learning algorithms are increasingly deployed to address challenges that are unsuitable for being, or too costly to be, addressed using traditional computer programming techniques. Increasing data volumes, widening varieties of data and more complex system requirements tend to require machine learning techniques. It can therefore be necessary to produce models that can analyse larger, more complex data sets and deliver faster, more accurate results and preferably without programmer intervention.

Many different machine learning algorithms exist and, in general, a machine learning algorithm can be expressed as a method to approximate an ideal target function, f, that best maps input variables x (the domain) to output variables y (the range), thus:

$$y=f(x)$$

The machine learning algorithm as an approximation of f is therefore suitable for providing predictions of y. Supervised machine learning algorithms generate a model for approximating f based on training data sets, each of which is associated with an output y. Supervised algorithms generate a model approximating f by a training process in which predictions can be formulated based on the output y associated with a training data set. The training process can iterate until the model achieves a desired level of accuracy on the training data.

Other machine learning algorithms do not require training. Unsupervised machine learning algorithms generate a model approximating f by deducing structures, relationships, themes and/or similarities present in input data. For example, rules can be extracted from the data, a mathematical process can be applied to systematically reduce redundancy, or data can be organised based on similarity.

Semi-supervised algorithms can also be employed, such as a hybrid of supervised and unsupervised approaches.

Notably, the range, y, of f can be, inter alia: a set of classes of a classification scheme, whether formally enumerated, extensible or undefined, such that the domain x is classified e.g. for labelling, categorising etc.; a set of clusters of data, where clusters can be determined based on the domain x and/or features of an intermediate range y'; or a continuous variable such as a value, series of values or the like.

Regression algorithms for machine learning can model f with a continuous range y. Examples of such algorithms include: Ordinary Least Squares Regression (OLSR); Linear Regression; Logistic Regression; Stepwise Regression; Multivariate Adaptive Regression Splines (MARS); and Locally Estimated Scatterplot Smoothing (LOESS).

Clustering algorithms can be used, for example, to infer f to describe hidden structure from data including unlabelled data. Such algorithms include, inter alia: k-means; mixture models; neural networks; and hierarchical clustering. Anomaly detection algorithms can also be employed.

Classification algorithms address the challenge of identifying which of a set of classes or categories (range y) one or more observations (domain x) belong. Such algorithms are typically supervised or semi-supervised based on a training set of data. Algorithms can include, inter alia: linear classifiers such as Fisher's linear discriminant, logistic regression, Naïve Bayes classifier; support vector machines (SVMs) such as a least squares support vector machine; quadratic classifiers; kernel estimation; decision trees; neural networks; and learning vector quantisation.

While the detailed implementation of any machine learning algorithm is beyond the scope of this description, the manner of their implementation will be familiar to those skilled in the art with reference to relevant literature including, inter alia: "Machine Learning" (Tom M. Mitchell, McGraw-Hill, 1 Mar. 1997); "Elements of Statistical Learning" (Hastie et al, Springer, 2003); "Pattern Recognition and Machine Learning" (Christopher M. Bishop, Springer, 2006); "Machine Learning: The Art and Science of Algorithms that Make Sense of Data" (Peter Flach, Cambridge, 2012); and "Fundamentals of Machine Learning for Predictive Data Analytics: Algorithms, Worked Examples, and Case Studies" (John D. Kelleher, MIT Press, 2015).

Thus it can be seen that a selection of a machine learning algorithm to address a problem can be challenging in view of the numerous alternatives available, each with varying suitability. Furthermore, machine learning algorithms are tailored specifically for a task and implemented in a manner that tightly coupled algorithms to tasks. It would be beneficial to address these challenges in the state of the art to provide for more effective execution and arrangement of machine learning algorithms.

According to a first aspect of the present invention, there is provided a computer implemented method of a machine learning algorithm modelling a target function mapping inputs in an input domain to outputs in an output range, the machine learning algorithm including an array of processing nodes arranged in a network of layers of nodes including an input layer for receiving an input value, an output layer for providing an output value, and one or more intermediate layers between the input and output layers, each node in the processing set being outside the input layer receiving input from at least some adjacent nodes logically closer to the input layer via weighted connections between nodes, and each node being outside the output layer generating output to at least some adjacent nodes logically closer to the output layer via weighted connections between nodes, wherein each node includes: an adjustable weight for application to each input to the node, the adjustment weight being responsive to a threshold function applied to a value of the node input; a combination function for combining outputs of the threshold function; and a node bypass function for selectively mapping one or more of the inputs to the node to the output of the node, the method comprising iteratively training the machine learning algorithm to model the target function by adjustment, at each iteration, of at least weights of connections between at least a subset of the nodes, such that the nodes of the network are programmable during operation of the algorithm by adjustment of the threshold function and the bypass function so as to selectively emphasise subsets of nodes in the network.

Preferably, the target function is defined through example by a set of inputs each associated with an output.

Preferably, the algorithm is iteratively trained using back-propagation.

Preferably, the machine learning algorithm is trained by an evolutionary algorithm whereby adjustments to the threshold functions and/or weights of connections between nodes are made by mutation and measurement of a degree of fitness of the machine learning algorithm to model the target function.

Preferably, the threshold function of at least a subset of nodes is adjusted during training in response to a measure of a degree of fitness of the algorithm for modelling the target function.

Preferably, the bypass function of at least a subset of nodes selectively maps in response to a measure of a degree of fitness of the algorithm for modelling the target function.

According to a second aspect of the present invention, there is a provided a computer system including a processor and memory storing computer program code for performing the steps of the method set out above.

According to a third aspect of the present invention, there is a provided a computer system including a processor and memory storing computer program code for performing the steps of the method set out above.

BRIEF DESCRIPTION OF THE DRAWINGS

Embodiments of the present invention will now be described, by way of example only, with reference to the accompanying drawings, in which.

DETAILED DESCRIPTION OF PRESENT EXAMPLE EMBODIMENTS

Figure 1:
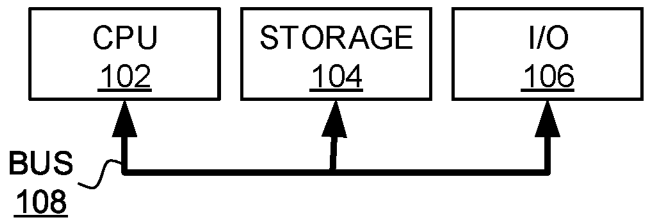
FIG. 1 is a block diagram a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
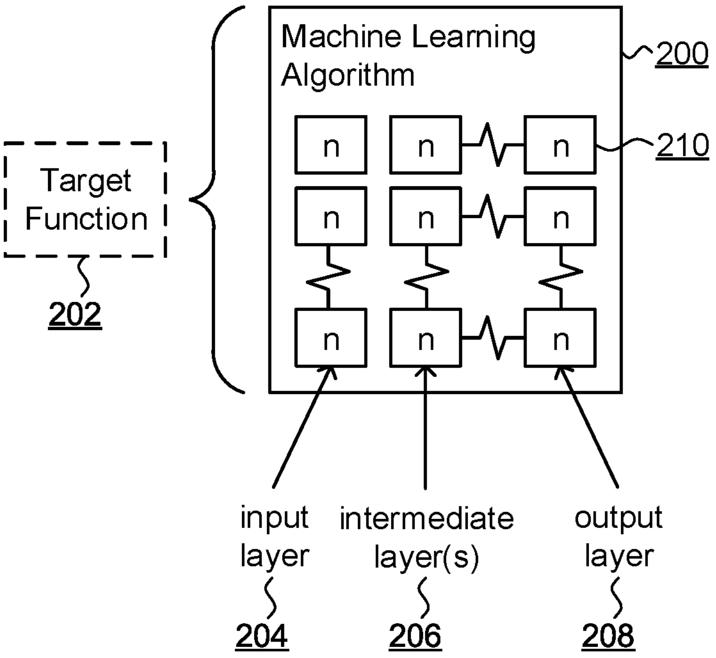
FIG. 2 is a component diagram of a machine learning algorithm in accordance with embodiments of the present invention.

FIG. 2 is a component diagram of a machine learning algorithm 200 in accordance with embodiments of the present invention. The algorithm 200 is a trainable machine learning model for modelling a target function 202 mapping inputs in an input domain to outputs in an output range. Notably, the target function 202 may be determinative, or may be indeterminate such as a target function 202 defined through example by a set of inputs each associated with a valid or correct output. The algorithm 200 comprises an array of processing nodes 210 arranged in a network of layers of nodes for receiving input data and processing the input data to generate output data, so modelling the target function 202. The processing nodes 210 include subsets arranged as an input layer of nodes 204, one or more intermediate layers of nodes 206, and an output layer of nodes 208. Each node 210 in algorithm 200 that is not in the input layer receives input from one or more adjacent nodes logically closer to the input layer via weighted connections between nodes. Each node 210 that is not in the output layer generates output to at least some adjacent nodes logically closer to the output layer via weighted connections between nodes. Connections between nodes are weighted in a manner that is adjustable by training of the algorithm 200. Thus, data is logically communicated through the array of nodes via the layers of nodes from the input layer 204, via the intermediate layer(s) 206, to the output layer 208, being processed by nodes during the communication process.

In use, the machine learning algorithm is trained iteratively using a conventional training approach such as supervised or unsupervised machine learning including, for example, backpropagation, based on training data provided via nodes 210 in the input layer 204. During training, adjustments are made to the weights of weighted connections between nodes. Preferably, training is continued until a measure of a degree of fitness of the machine learning algorithm 200 to model the target function 202 meets a threshold degree. For example, a degree of fitness can be measured by way of test data for which proper or expected output of the target function applied to the test data is known. Such test data provided as input to the trained machine learning algorithm 200 to generate output at the output layer 208 can be used to compare with proper or expected output of the target function 202 to measure a degree of affinity or fitness of the trained algorithm 200 to mode the target function 202.

Embodiments of the present invention provide for programming of the machine learning algorithm 200 by way of programming the network during operation of the algorithm by adjustment of characteristics of the nodes 210 so as to selectively emphasise subsets of the nodes in the network. Such selective emphasis provides for the formation of dominant subsets of nodes in the machine learning algorithm 200 and for the provision of an improved memory capability of the algorithm 200.

Figure 3:
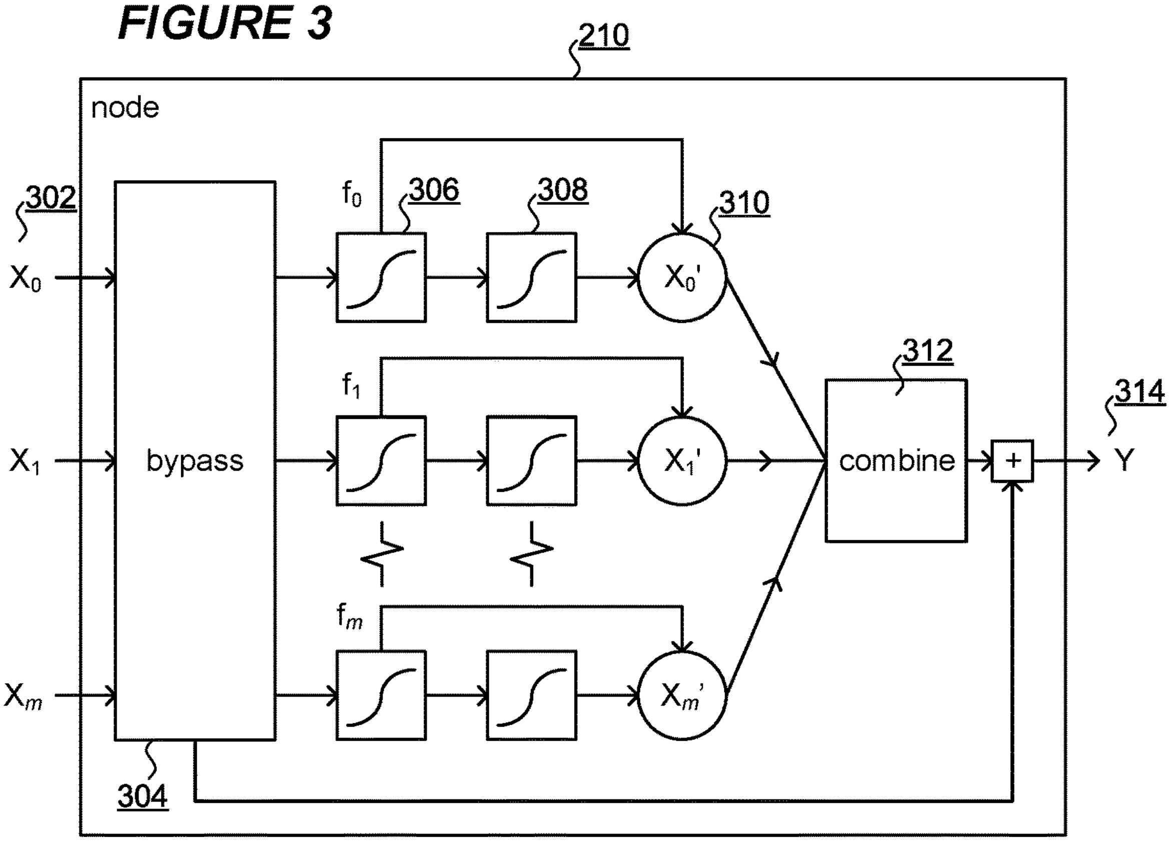
FIG. 3 is a component diagram of an arrangement of a node of the machine learning algorithm of FIG. 2 in accordance with embodiments of the present invention.

FIG. 3 is a component diagram of an arrangement of a node 210 of the machine learning algorithm 200 of FIG. 2 in accordance with embodiments of the present invention. The node 210 is a representation of any suitable node 210 in the arrangement of FIG. 2 whether in the input layer 204, intermediate layer(s) 206 or output layer 208. The node 210 is adapted to receive one or more inputs 302, $X_0, X_1, \ldots X_m$, such as inputs received as inputs to the machine learning algorithm 200 in the input layer 204 or inputs received via a weighted connection from adjacent nodes. The node 210 is further adapted to generate an output 314, Y, such as outputs communicated to adjacent nodes via weighted connections or outputs of the algorithm 200 by nodes in the output layer 208.

In contrast to nodes, neurons or comparable processing elements in conventional machine learning algorithms, the node 210 according to the present invention includes a bypass function 304, and one or more threshold functions 306, 308 with indicators $f_0$, $f_1$, $f_m$ for determining a weight for application to inputs $X_0$, $X_1$, $X_m$ to emphasise or deemphasise inputs in the node 210.

The bypass function 304 selectively maps one or more of the node inputs $X_0$, $X_1$, $X_m$ to the output 314, Y of the node 210. The bypass function 304 is programmable at a runtime of the machine learning algorithm 210 to influence a value of the output 314 of the node 210 such as by locking the value to a value of one of the inputs $X_0$, $X_1$, $X_m$. The selection of the bypass 304 can be made by a process or parameter external to the algorithm 200 such as based on an input or configuration of the algorithm 200.

Where the bypass function 304 is not selected, inputs $X_0$, $X_1$, $X_m$ are each processed by a threshold function 306 such as a sigmoid function. Responsive to the threshold function 306, an indicator $f_0$, $f_1$, $f_m$ identifies whether an input $X_0$, $X_1$, $X_m$, so processed by the threshold function 306, is to be emphasised or deemphasised such as by indicating an excitatory or inhibitory effect of the respective input. For example, an excitatory effect can be realised by emphasising an input such as by magnifying, multiplying, scaling or increasing a value of the input. In contrast, in inhibitory effect can be realised by deemphasising an input such as by reducing a value of the input. In some embodiments, inputs may be further processed by one or more further threshold functions 308. Threshold functions of the node 210 may be adjusted, reconfigured or adapted as part of the training process to improve fitness of the algorithm 200 to model the target function 202.

Thus, in use, the machine learning algorithm 200 is trained iteratively to model the target function 202 by adjustment, at each iteration, of weights of connections between at least a subset of nodes 210 in the algorithm 200. Furthermore, the nodes of the algorithm 200 are programmable during operation of the algorithm 200 by adjustment of the threshold function 306 for emphasising or deemphasising inputs to a node 210, and by selective bypassing of a node 210 by the bypass function 304.

In one embodiment, the machine learning algorithm 200 is trained by an evolutionary algorithm technique whereby adjustments to the threshold function(s) 306, 308 and/or the weights of connections between nodes 210 are made by mutation. The evolutionary algorithm can operate on the basis of an objective function such as a measurement of a degree of fitness of the machine learning algorithm to model the target function such that exemplars in generations of evolutionary adjustments are retained or discarded based such a measure.

Thus, in one embodiment, for a machine learning algorithm 200 having an array of nodes 210 of predetermined dimension, training data is presented to the nodes at the input layer 204 and the algorithm 200 can be tested using a standard loss/error function. Error values can be propagated through the array of nodes and used to modify one or more of the following:

- Node interconnection weight and bias values, such as is known from backpropagation.
- Time constants as part of a phase lock mechanism by locking values of nodes using the bypass function 304.
- A degree of inhibition or excitation applied by the indicators $f_0$, $f_1$, $f_m$.

Each node 210 can also contain an internal logic state table that modifies the inhibition/excitation weights so permitting the algorithm 200 to act as a programmable logic array. The logic state can be defined by a binary truth table which determines whether an input to a node 210 excites or inhibits the node 210 to a degree that can be variable by weightings applied to each input to the node 210. The state of the truth table for each node 210 may either be predefined or dynamically adapted as part of a training phase. Unlike a conventional programmable gate array, the logic can be part of a learned response of the algorithm.

Figure 4:
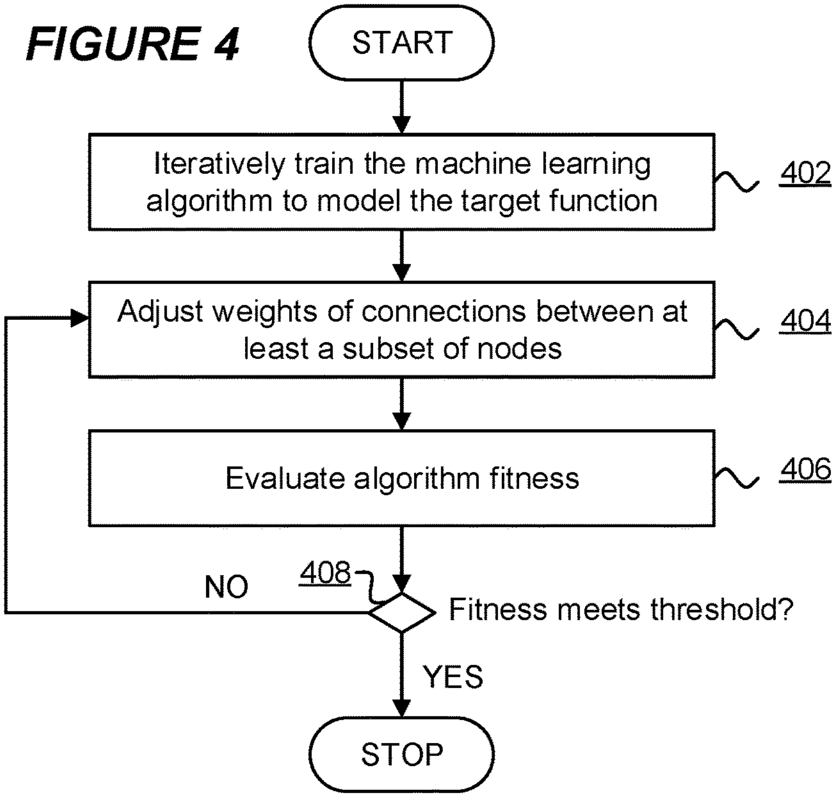
FIG. 4 is a flowchart of a method of a machine learning algorithm according to embodiments of the present invention.

FIG. 4 is a flowchart of a method of a machine learning algorithm 200 according to embodiments of the present invention. Initially, at step 402, the method iteratively trains the machine learning algorithm 200 to model the target function. At step 404 the method iterates through adjustments to weights of connections between at least a subset of nodes 210. At step 406 the method evaluates the algorithms fitness to model the target function 202. Where fitness does not meet a predetermined threshold the method iterates at step 408.

In some embodiments, the algorithm can adapt its internal topology such that sub-networks are dynamically formed to perform specific tasks required to properly model the target function 202. Such sub-networks can be considered to operate in a manner similar to subroutines. Further, in some embodiments the dimensions of the array of nodes 210 in the algorithm can be dynamically adjusted such as by growing or shrinking the array during training, such as to adjust a rate of learning or to accommodate constraints or availability of computing resource. Such adjustments permit the algorithm 200 to respond to, and dynamically adjust for, changes in computing or network performance.

The bypass function 304 within each node 210 provides a "phase tracking" facility which can be employed to "phase lock" nodes to a current state of a connected node. This is beneficial if the algorithm 200 is modelling a time-dependent functions such as signal processing, or real-time speech analysis. It can also be used to help form localised blocks of nodes 210 with specific logic functions. For example, time constants to regulate such a phase-locking process may be included as part of learning hyperparameters of machine learning algorithm. In some embodiments, the algorithm 200 can learn to group nodes 210 for a specific target function, such as a group of phase locked nodes 210 emerging from training in response to specific features within the training data, e.g. edges in images, or phonemes in speech analysis.

In embodiments where an evolutionary algorithm may be employed, groups of nodes 210 in the algorithm 200, such as layers or columns or nodes 210, can be mapped to a single chromosome and parameters of each node 210 within such group can form a corresponding genes within the chromosome. In such an embodiment, A training phase can use a number of fitness evaluation steps of the algorithm 200.

An algorithm 200 such as that implemented in accordance with embodiments of the present invention can take a form of a recurrent neural network model with each node 210 containing a primary transfer function plus state logic to control the effects of each input connection on the node 210 output. A resulting node 210 can also act as an external forgetting gate, or memory gate to a neighbouring node 210, via its application of an inhibitory or excitory signal as previously described.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A computer implemented method comprising:

obtaining a machine learning algorithm modelling a target function mapping inputs in an input domain to outputs in an output range, the machine learning algorithm including an array of processing nodes arranged in a network of layers of nodes including an input layer for receiving an input value, an output layer for providing an output value, and one or more intermediate layers between the input and output layers, each node in the processing set being outside the input layer receiving input from at least some adjacent nodes logically closer to the input layer via weighted connections between nodes, and each node being outside the output layer generating output to at least some adjacent nodes logically closer to the output layer via weighted connections between nodes, wherein each node includes:

an adjustable input weighting for application to each input to the node, the adjustable inpat weighting being responsive to a threshold function applied to a value of the node input;

a combination function for combining outputs of the threshold function; and a node bypass function for selectively mapping one or more of the inputs to the node to the output of the nodes; and iteratively training the machine learning algorithm to model the target function by adjustment, at each iteration, of at least weights of connections between at least a subset of the nodes, such that the nodes of the network are programmable during operation of the machine learning algorithm by adjustment of the threshold function and the bypass function so as to selectively emphasize subsets of nodes in the network, wherein the training of the machine learning algorithm comprises growing or shrinking the array during training in order to dynamically adjust for changes in a computing resource or network performance.

2. The method of claim 1 wherein the target function is maps image input or speech data input to output features including edges in the image input or phonemes in the speech data input.

3. The method of claim 1 wherein the machine learning algorithm is iteratively trained using backpropagation.

4. The method of claim 1 wherein the machine learning algorithm is trained by an evolutionary algorithm whereby adjustments to the threshold functions and/or weights of connections between nodes are made by mutation and measurement of a degree of fitness of the machine learning algorithm to model the target function.

5. The method of claim 1 wherein the threshold function of at least a subset of nodes is adjusted during training in response to a measure of a degree of fitness of the machine learning algorithm for modelling the target function.

6. The method of claim 1 where the bypass function of at least a subset of nodes selectively maps in response to a measure of a degree of fitness of the machine learning algorithm for modelling the target function.

7. A computer system comprising:

a processor and memory storing computer program code which is executable by the processor to cause the computer system to at least be configured to obtain a machine learning algorithm modelling a target function mapping inputs in an input domain to outputs in an output range, the machine learning algorithm including an array of processing nodes arranged in a network of layers of nodes including an input layer for receiving an input value, an output layer for providing an output value, and one or more intermediate layers between the input and output layers, each node in the processing set being outside the input layer receiving input from at least some adjacent nodes logically closer to the input layer via weighted connections between nodes, and each node being outside the output layer generating output to at least some adjacent nodes logically closer to the output layer via weighted connections between nodes, wherein each node includes:

an adjustable input weighting for application to each input to the node, the adjustable input weighting being responsive to a threshold function applied to a value of the node input;

a combination function for combining outputs of the threshold function; and a node bypass function for selectively mapping one or more of the inputs to the node to the output of the node; and iteratively train the machine learning algorithm to model the target function by adjustment, at each iteration, of at least weights of connections between at least a subset of the nodes, such that the nodes of the network are programmable during operation of the machine learning algorithm by adjustment of the threshold function and the bypass function so as to selectively emphasize subsets of nodes in the network, wherein to train the machine learning algorithm. the computer system is further configured to grow or shrink the array during training in order to dynamically adjust for changes in a computing resource or network performance.

8. A non-transitory computer-readable storage medium comprising computer program code to, when loaded into a computer system and executed thereon, cause the computer system to perform steps of a method comprising:

obtaining a machine learning algorithm modelling a target function mapping inputs in an input domain to outputs in an output range, the machine learning algorithm including an array of processing nodes arranged in a network of layers of nodes including an input layer for receiving an input value, an output layer for providing an output value, and one or more intermediate layers between the input and output layers, each node in the processing set being outside the input layer receiving input from at least some adjacent nodes logically closer to the input layer via weighted connections between nodes, and each node being outside the output layer generating output to at least some adjacent nodes logically closer to the output layer via weighted connections between nodes, wherein each node includes:

an adjustable input weighting for application to each input to the node, the adjustable input weighting being responsive to a threshold function applied to a value of the node input;

a combination function for combining outputs of the threshold function; and a node bypass function for selectively mapping one or more of the inputs to the node to the output of the node; and iteratively training the machine learning algorithm to model the target function by adjustment, at each iteration, of at least weights of connections between at least a subset of the nodes, such that the nodes of the network are programmable during operation of the machine learning algorithm by adjustment of the threshold function and the bypass function so as to selectively emphasize subsets of nodes in the network, wherein the training of the machine learning algorithm comprises growing or shrinking the array during training in order to dynamically adjust for changes in a computing resource or network performance.

9. The computer system of claim 7 wherein the target function maps image input or speech data input to output features including edges in the image input or phonemes in the speech data input.

10. The computer system of claim 7 wherein the machine learning algorithm is iteratively trained using backpropagation.

11. The computer system of claim 7 wherein the machine learning algorithm is trained by an evolutionary algorithm whereby adjustments to the threshold functions and/or weights of connections between nodes are made by mutation and measurement of a degree of fitness of the machine learning algorithm to model the target function.

12. The computer system of claim 7 wherein the threshold function of at least a subset of nodes is adjusted during training in response to a measure of a degree of fitness of the machine learning algorithm for modelling the target function.

13. The computer system of claim 7 wherein the bypass function of at least a subset of nodes selectively maps in response to a measure of a degree of fitness of the machine learning algorithm for modelling the target function.

14. The computer system of claim 7 wherein the machine learning algorithm is trained by an evolutionary algorithm whereby adjustments to the threshold functions and weights of connections between nodes are made by mutation and measurement of a degree of fitness of the machine learning algorithm to model the target function.

15. The computer system of claim 7 wherein the bypass function of each node is configured to provide within each node a phase tracking so as to phase lock nodes to a current state of a connected node.

16. The computer system of claim 7 wherein the bypass function is configured during the operation of the machine learning algorithm to lock a value of the output value to a value of one of the inputs.

17. The method of claim 1 wherein the machine learning algorithm is trained by an evolutionary algorithm whereby adjustments to the threshold functions and weights of connections between nodes are made by mutation and measurement of a degree of fitness of the machine learning algorithm to model the target function.

18. The method of claim 1 where the bypass function of each node provides within each node a phase tracking so as to phase lock nodes to a current state of a connected node.

19. The method of claim 1 the bypass function, during the operation of the machine learning algorithm, locks a value of the output value to a value of one of the inputs.

20. The non-transitory computer-readable storage medium of claim 8, wherein the target functionmaps image input or speech data input to output features including edges in the image input or phonemes in the speech data input.

* * * * *